United States Patent
Lai et al.

(10) Patent No.: US 8,219,159 B2
(45) Date of Patent: Jul. 10, 2012

(54) COVER FLIP MECHANISM AND ELECTRONIC DEVICE USING THE SAME

(75) Inventors: Chin-Chung Lai, Taipei (TW); Hung-Chang Hung, Taipei (TW)

(73) Assignee: Asustek Computer Inc., Taipei (TW)

(*) Notice: Subject to any disclaimer, the term of this patent is extended or adjusted under 35 U.S.C. 154(b) by 720 days.

(21) Appl. No.: 12/216,010

(22) Filed: Jun. 27, 2008

(65) Prior Publication Data

US 2009/0009949 A1    Jan. 8, 2009

(30) Foreign Application Priority Data

Jul. 4, 2007  (TW) ................................ 96124379 A

(51) Int. Cl.
*H04M 1/00* (2006.01)

(52) U.S. Cl. ................ 455/575.1; 455/575.3; 455/575.8; 455/566; 455/556.2; 361/679.02

(58) Field of Classification Search ............... 455/575.1, 455/575.3, 575.4, 575.8, 566, 550.1, 90.3, 455/556.1, 556.2; 361/679.02, 679.06, 679.26
See application file for complete search history.

(56) References Cited

U.S. PATENT DOCUMENTS

| | | | | |
|---|---|---|---|---|
| 4,986,763 A | * | 1/1991 | Boyle | 439/165 |
| 5,548,478 A | * | 8/1996 | Kumar et al. | 361/679.27 |
| 5,997,323 A | * | 12/1999 | Youn | 439/159 |
| 6,791,826 B2 | * | 9/2004 | Ho | 361/679.27 |
| 6,903,927 B2 | * | 6/2005 | Anlauff | 361/679.28 |
| 6,980,420 B2 | * | 12/2005 | Maskatia et al. | 361/679.57 |
| 7,480,524 B2 | * | 1/2009 | Moon et al. | 455/575.4 |
| 2006/0128449 A1 | * | 6/2006 | Park | 455/575.4 |

FOREIGN PATENT DOCUMENTS

CN             2814908 Y        9/2006

* cited by examiner

*Primary Examiner* — Shaima Q Aminzay
(74) *Attorney, Agent, or Firm* — Bacon & Thomas, PLLC

(57) ABSTRACT

A cover flip mechanism and an electronic device using the same are provided. An electronic device with the cover flip mechanism includes a first casing and a second casing. The cover flip mechanism includes a sliding mechanism connected to the first casing and the second casing, a rotating mechanism having a supporting portion and a rotating portion disposed at the second casing and is connected to the supporting portion, a fastener pivotally connected to the second casing and a protrudent block disposed at the first casing. When the first casing slides relatively to the second casing to the rotating location, the protrudent block pushes the fastener, and then the fastener rotates and releases the supporting portion. Therefore, the supporting portion can rotate relatively to the second casing via the rotating portion further to push the first casing to rotate relatively to the second casing.

17 Claims, 6 Drawing Sheets

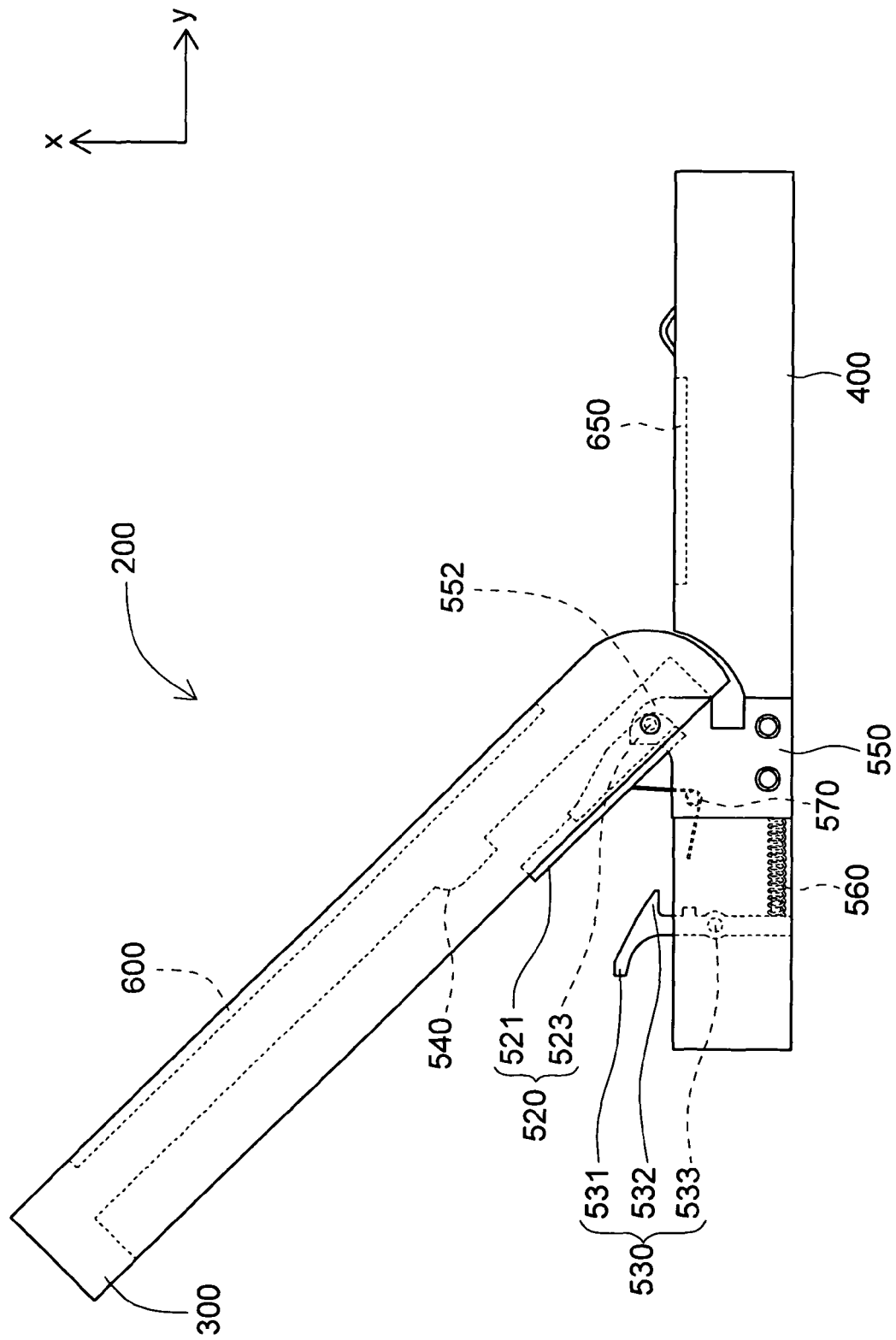

COVER FLIP MECHANISM AND ELECTRONIC DEVICE USING THE SAME

This application claims the benefit of Taiwan application Serial No. 96124379, filed Jul. 4, 2007, the subject matter of which is incorporated herein by reference.

BACKGROUND OF THE INVENTION

1. Field of the Invention

The invention relates to a cover flip mechanism and an electronic device using the same and, more particularly, to a cover flip mechanism for opening a casing and an electronic device using the same.

2. Description of the Related Art

Along with the progress of the science and technology, an information appliance (IA) is popularly used. The common IA may be a notebook computer, a mobile phone, a smart phone or a personal digital assistant (PDA).

FIG. 1A is a schematic diagram showing a conventional mobile phone. A mobile phone 100 includes a first casing 101, a second casing 102, a display screen 103, a sliding assembly 104 and a keyboard 105. A user utilizes the sliding assembly 104 to make the first casing 101 slide relatively to the second casing 102 to a location shown in FIG. 1A.

When the user watches the display screen 103, he needs to hold the mobile phone 100. FIG. 1B is a schematic diagram showing the mobile phone which is shown in FIG. 1A and is held by the user. As shown in FIG. 1B, the user needs to hold the mobile phone to watch the display screen 103 or operate the keyboard 105. However, it is inconvenient for the user to operate the mobile phone 100 by holding the mobile phone 100.

BRIEF SUMMARY OF THE INVENTION

The invention relates to a cover flip mechanism and an electronic device using the same. The cover flip mechanism and the electronic device using the same utilize a sliding mechanism and a rotating mechanism which cooperate with each other to allow a first casing to slide and rotate relatively to a second casing.

The invention provides a cover flip mechanism. The cover flip mechanism is disposed at an electronic device. The electronic device includes a first casing and a second casing. The cover flip mechanism includes a sliding mechanism, a rotating mechanism, a fastener and a protrudent block. The sliding mechanism is connected to the first casing and the second casing. The sliding mechanism is used for driving the first casing to slide relatively to the second casing to a rotating location. The rotating mechanism has a supporting portion and a rotating portion. The rotating portion is disposed at the second casing and is connected to the supporting portion. The fastener is pivotally connected to the second casing. The fastener is used to fasten the supporting portion. The protrudent block is disposed at the first casing. When the first casing slides relatively to the second casing to the rotating location, the protrudent block pushes the fastener to allow the fastener to rotate and release the supporting portion. Thus, the supporting portion can rotate relatively to the second casing via the rotating portion further to push the first casing to rotate relatively to the second casing.

The invention further provides an electronic device. The electronic device includes a first casing, a second casing and a cover flip mechanism. The cover flip mechanism includes a sliding mechanism, a rotating mechanism, a fastener and a protrudent block. The sliding mechanism is connected to the first casing and the second casing. The sliding mechanism is used for driving the first casing to slide relatively to the second casing to a rotating location. The rotating mechanism has a supporting portion and a rotating portion. The rotating portion is disposed at the second casing and is connected to the supporting portion. The fastener is pivotally connected to the second casing. The fastener is used to fasten the supporting portion. The protrudent block is disposed at the first casing. When the first casing slides relatively to the second casing to the rotating location, the protrudent block pushes the fastener to allow the fastener to rotate and release the supporting portion. Thus, the supporting portion can rotate relatively to the second casing via the rotating portion further to push the first casing to rotate relatively to the second casing.

These and other features, aspects, and advantages of the present invention will become better understood with regard to the following description, appended claims, and accompanying drawings.

BRIEF DESCRIPTION OF THE SEVERAL VIEWS OF THE DRAWINGS

FIG. 5 is a schematic diagram showing the first casing and the second casing in FIG. 4 after the first casing rotates relatively to the second casing.

DETAILED DESCRIPTION OF THE EMBODIMENTS

Figure 1A:
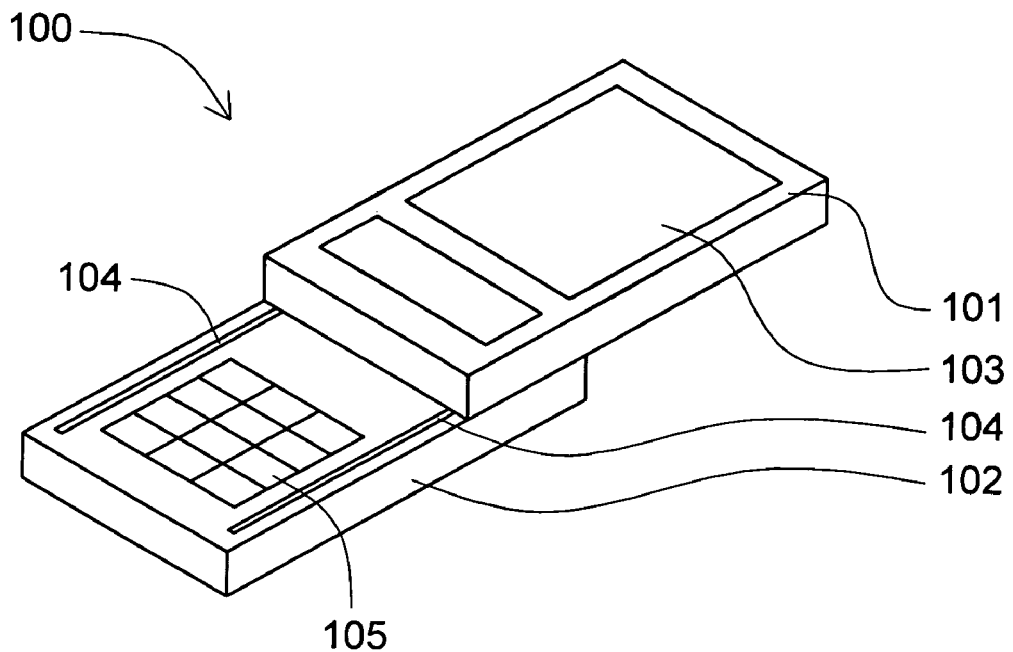
FIG. 1A is a schematic diagram showing a conventional mobile phone.
Figure 1B:
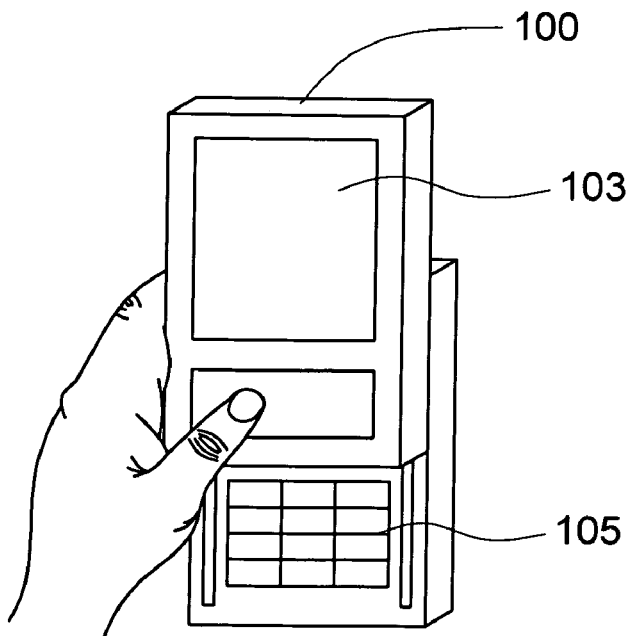
FIG. 1B is a schematic diagram showing the mobile phone which is shown in FIG. 1A and is held by a user.
Figure 2A:
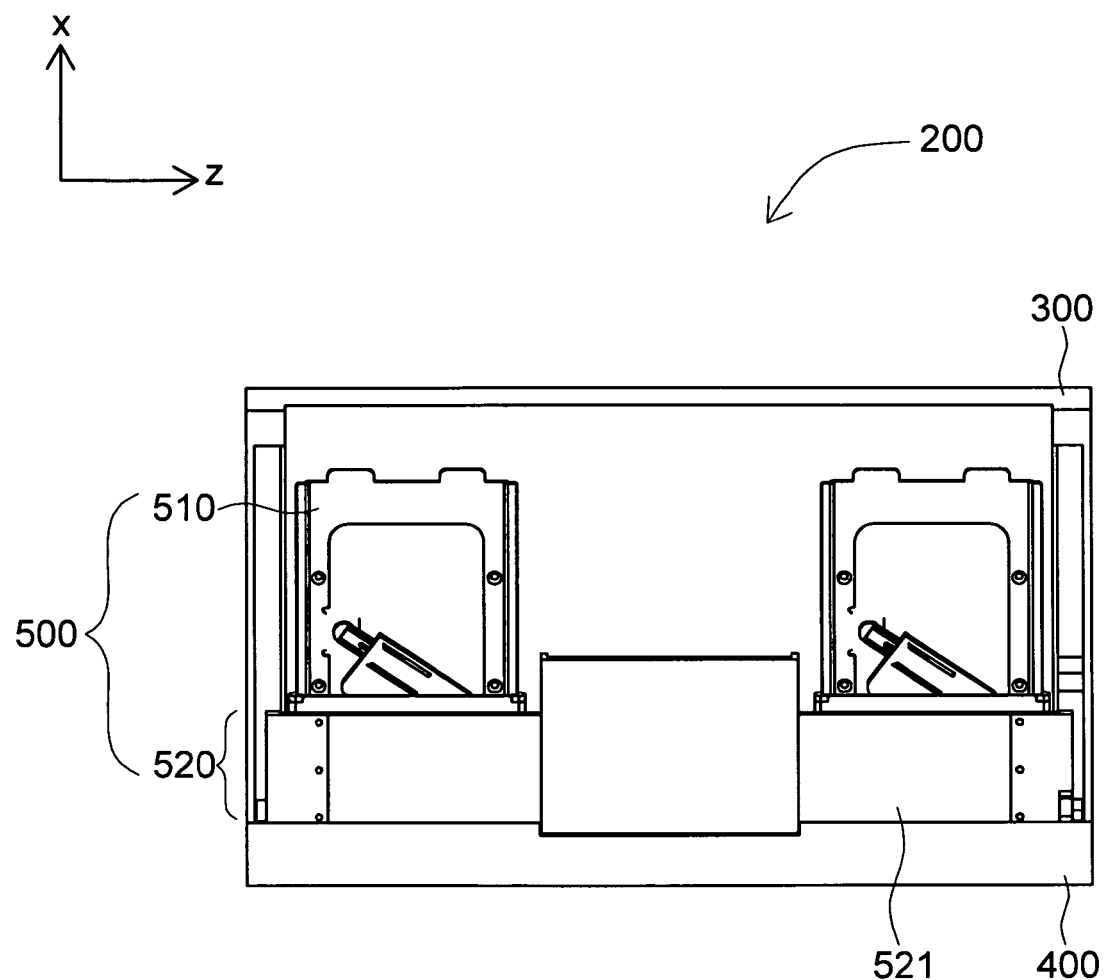
FIG. 2A is a back view showing an electronic device according to a preferred embodiment of the invention.
Figure 2B:
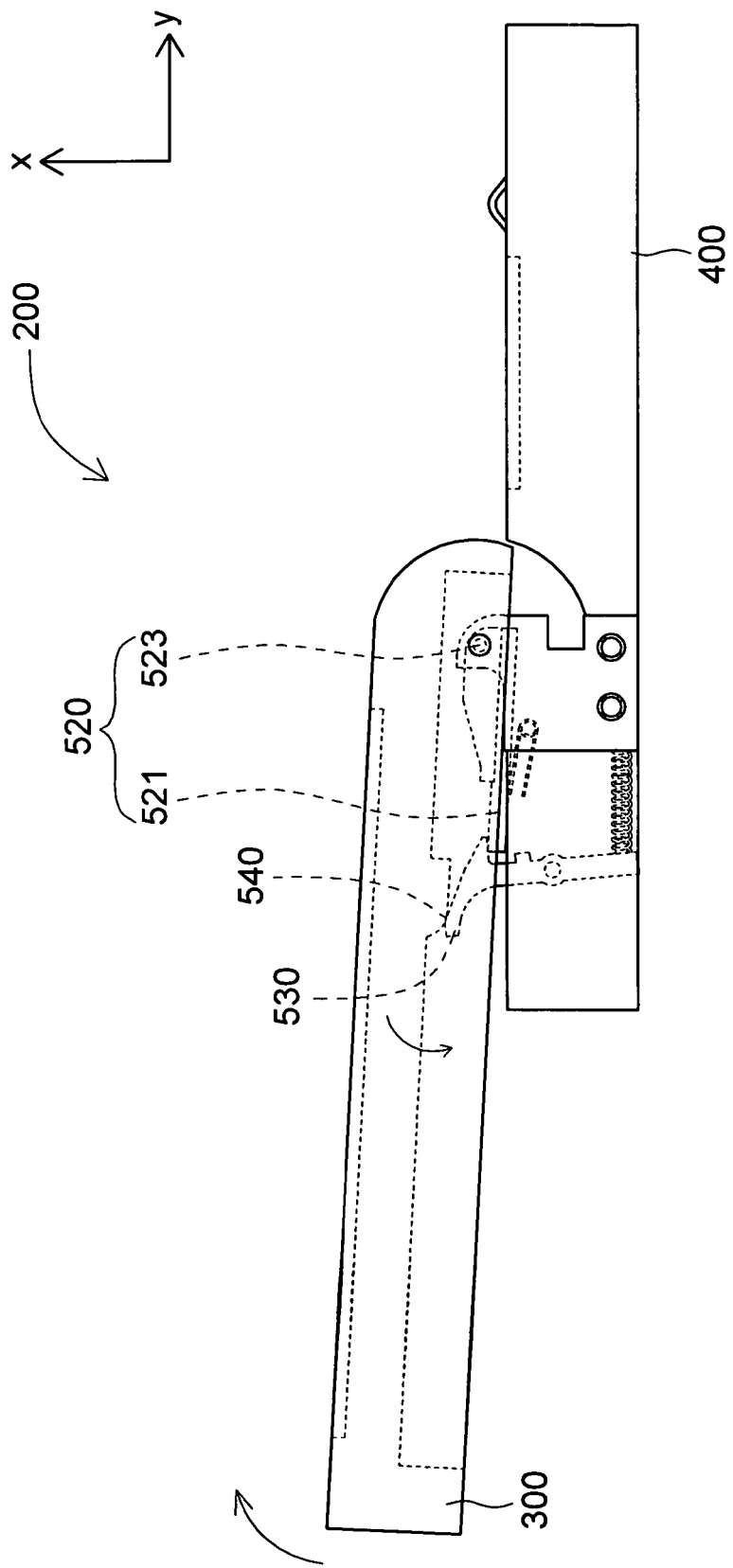
FIG. 2B is a side view showing the electronic device in FIG. 2A when a protrudent block of the electronic device pushes a fastener.

As shown in FIG. 2A and FIG. 2B, FIG. 2A is a back view showing an electronic device according to a preferred embodiment of the invention. FIG. 2B is a side view showing the electronic device in FIG. 2A when a protrudent block of the electronic device pushes a fastener. An electronic device 200 may be any type of information appliance such as a notebook computer, a mobile phone, a smart phone, a personal digital assistant (PDA) or a PDA phone, etc. In the embodiment, the electronic device 200 is a notebook computer.

The electronic device 200 includes a first casing 300, a second casing 400 and a cover flip mechanism 500. The cover flip mechanism 500 includes a sliding mechanism 510, a rotating mechanism 520, a fastener 530 (shown in FIG. 2B) and a protrudent block 540 (shown in FIG. 2B). As shown in FIG. 2A, the sliding mechanism 510 is connected to the first casing 300 and the second casing 400. The sliding mechanism 510 is used for driving the first casing 300 to slide relatively to the second casing 400 to a rotating location.

As shown in FIG. 2B, the rotating mechanism 520 has a supporting portion 521 and a rotating portion 523. The rotating portion 523 is disposed at the second casing 400 and is connected to the supporting portion 521. The fastener 530 is pivotally connected to the second casing 400. The fastener 530 is used to fasten the supporting portion 521. The protrudent block 540 is disposed at the first casing 300. When the first casing 300 slides relatively to the second casing 400 to the rotating location, the protrudent block 540 pushes the fastener 530 to allow the fastener 530 to rotate and release the supporting portion 521. Thus, the supporting portion 521 can rotate relatively to the second casing 400 via the rotating portion 523, and further push the first casing 300 to rotate relatively to the second casing 400.

In the embodiment, since the electronic device 200 is a notebook computer, the first casing 300 and the second casing 400 of the embodiment are two casings of the notebook computer.

Figure 3A:
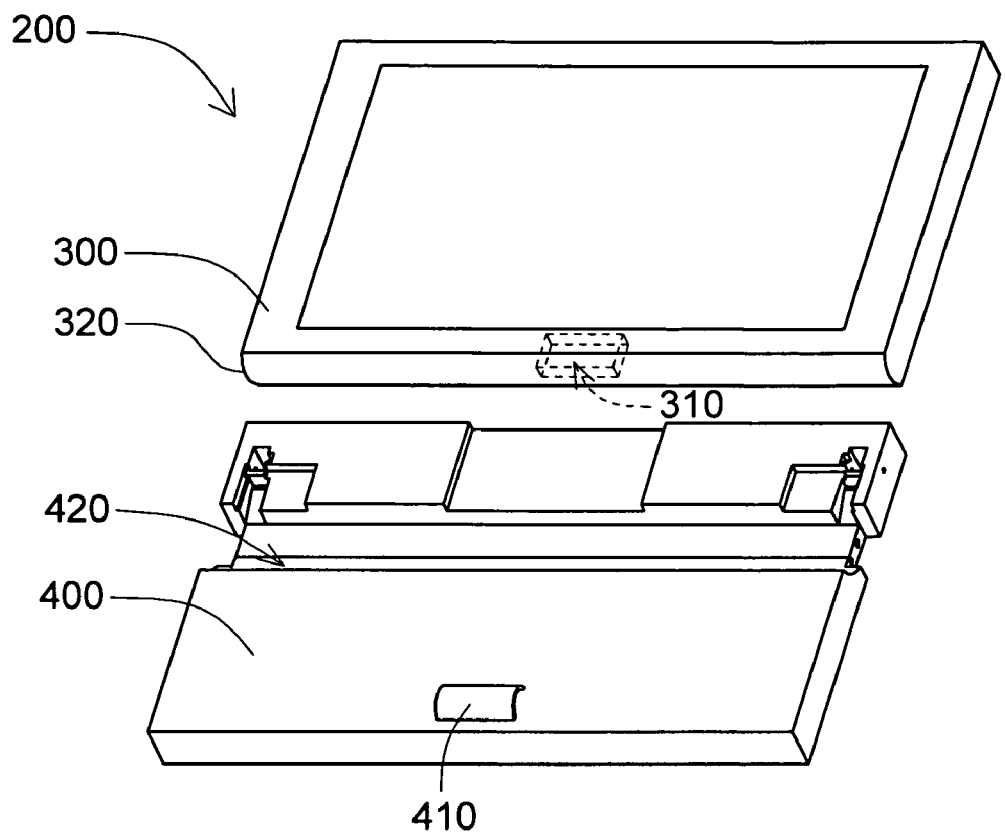
FIG. 3A is a schematic diagram showing a first casing and a second casing in FIG. 2B.
Figure 3B:
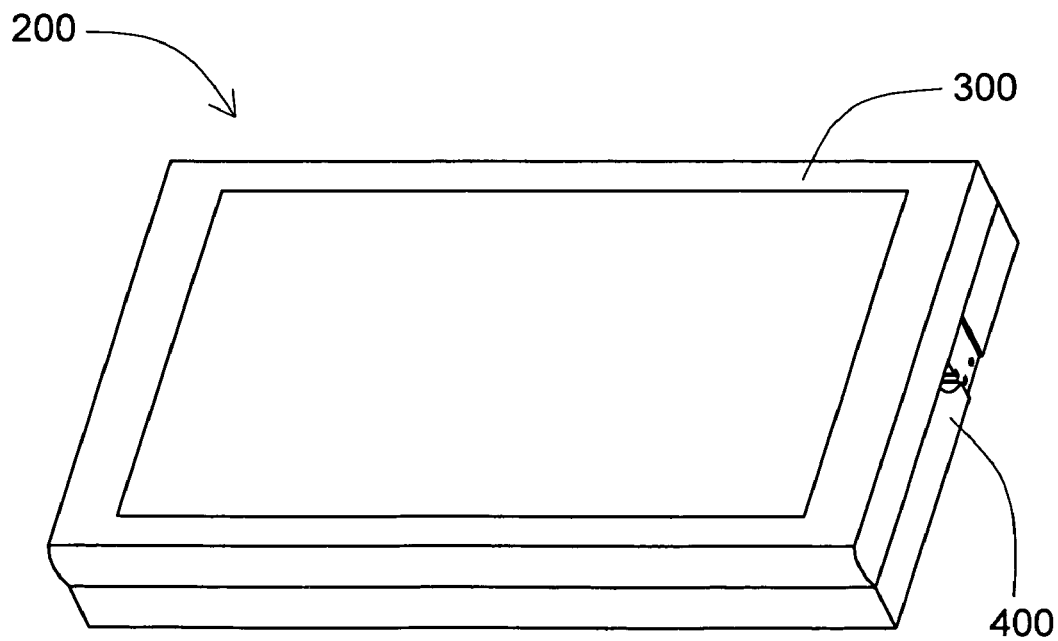
FIG. 3B is a schematic diagram showing the first casing and the second casing which are shown in FIG. 3A and are fastened to each other.

As shown in FIG. 3A and FIG. 3B, FIG. 3A is a schematic diagram showing the first casing and the second casing in FIG. 2B, and FIG. 3B is a schematic diagram showing the first casing and the second casing fastened to each other in FIG. 3A. In the embodiment, the first casing 300 of the electronic device 200 includes a fastening slot 310, and the second casing 400 includes a hook 410. As shown in FIG. 3B, the fastening slot 310 cooperates with the hook 410 to fasten the first casing 300 and the second casing 400. In this way, the first casing 300 is superimposed on the second casing 400 to help a user to carry or pack away the electronic device 200.

As shown in FIG. 3A, the second casing 400 has a recess 420, and the first casing 300 has a smooth rounding angle 320. The smooth rounding angle 320 is held in the recess 420 to allow the first casing 300 to smoothly rotate relatively to the second casing 400. In the embodiment, the shape of the recess 420 is corresponding to the shape of the smooth rounding angle 320. In this way, when the first casing 300 rotates relatively to the second casing 400, they do not knock against each other, and then the rotation of the first casing 300 is not affected.

Figure 4:
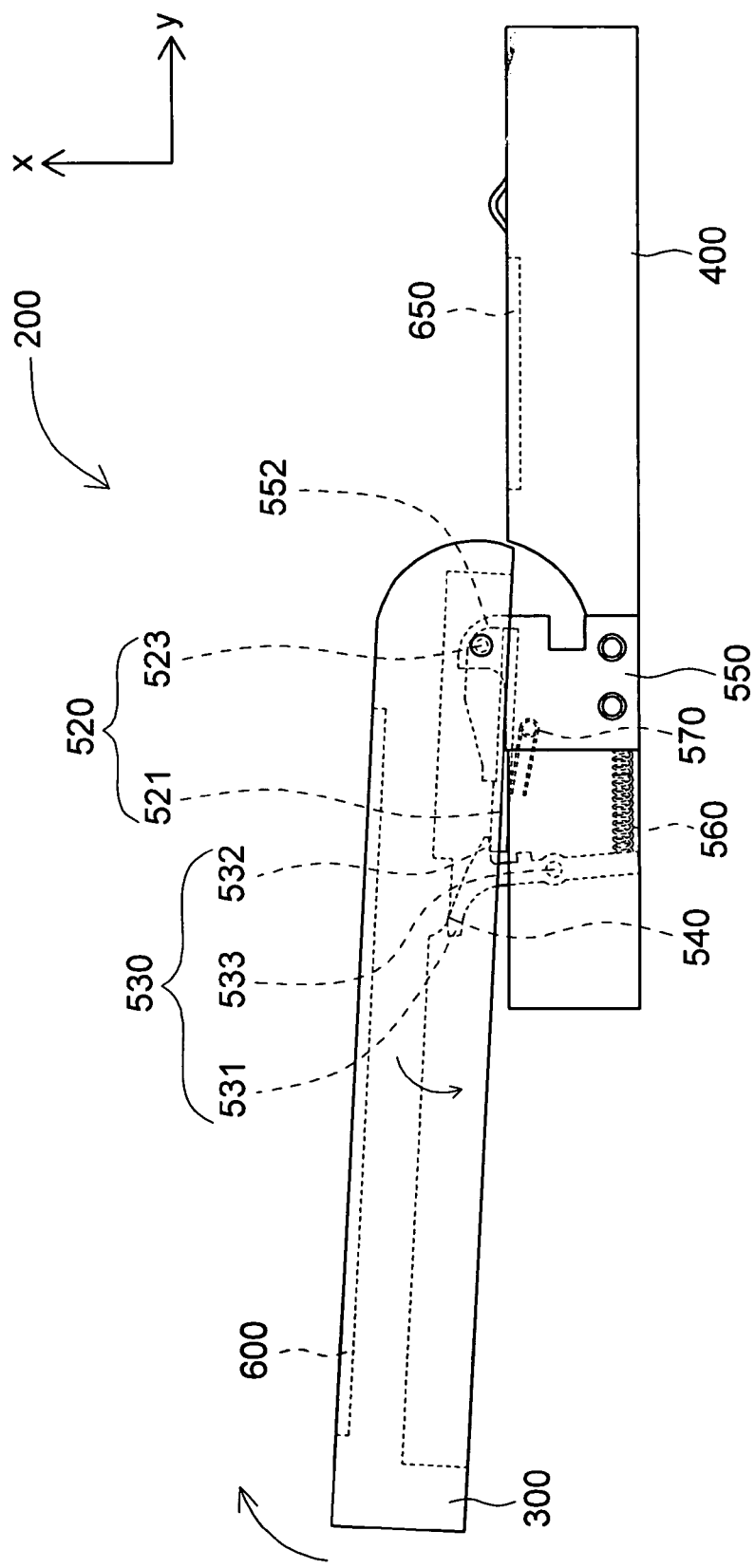
FIG. 4 is another side view showing the electronic device in FIG. 2B.

As shown in FIG. 4, FIG. 4 is another side view showing the electronic device in FIG. 2B. In the embodiment, the cover flip mechanism 500 (as shown in FIG. 2A) further includes an elastic member 570 and a positioning structure 550. The elastic member 570 abuts against the supporting portion 521, and has elastic potential energy. In the embodiment, the elastic member 570 may be a torsional spring. When the supporting portion 521 is released, the elastic potential energy of the elastic member 570 is converted to rotational kinetic energy of the supporting portion 521 to enable the supporting portion 521 to rotate relatively to the second casing 400 via the rotating portion 523. In this way, the supporting portion 521 pushes the first casing 300 to rotate relatively to the second casing 400.

FIG. 5 is a schematic diagram showing that in FIG. 4 after the first casing rotates relatively to the second casing. In the embodiment, a display screen 600 and a keyboard 650 are disposed at the first casing 300 and the second casing 400, respectively. Therefore, when the first casing 300 is located at a position shown in FIG. 5, a user can watch the display screen 600 and use the keyboard 650.

The positioning structure 550 of the embodiment is shown in FIG. 4 and FIG. 5. The positioning structure 550 is disposed at the second casing 400. The positioning structure 550 has a protrudent arm 552, and the protrudent arm 552 is used for positioning the first casing 300. That is, after the first casing 300 rotates relatively to the second casing 400, the protrudent arm 552 limits the rotation range of the first casing 300 to allow the first casing 300 to be locate at the position shown in FIG. 5. Therefore, the rotation range of the first casing 300 can be normalized via the design of the protrudent arm 552 to allow the positioning angle of the first casing 300 to meet the requirement of a user for watching the display screen 600. In the embodiment, the elastic member 570 is coupled to the positioning structure 550, and the rotating portion 523 is pivotally connected to the positioning structure 550.

As shown in FIG. 4, the fastener 530 of the embodiment has a first end 531, a second end 532 and a rotating point 533. The rotating point 533 of the fastener 530 is pivotally connected to the second casing 400. The second end 532 of the fastener 530 is used to fasten the supporting portion 521. When the first casing 300 utilizes the sliding mechanism 510 (as shown in FIG. 2A) to slide to the rotating location, the protrudent block 540 pushes the first end 531 of the fastener 530. The fastener 530 rotates with the rotating point 533 as the axis to allow the second end 532 to rotate relatively to the second casing 400 and release the supporting portion 521 of the rotating mechanism 520. The elastic potential energy of the elastic member 570 is converted to the rotational kinetic energy of the supporting portion 521. In this way, the supporting portion 521 can rotate relatively to the second casing 400 via the rotating portion 523, and further push the first casing 300 to rotate relatively to the second casing 400 to the location shown in FIG. 5. Then a user can conveniently watch the display screen 600.

In the embodiment, the cover flip mechanism 500 (as shown in FIG. 2A) further includes a spring 560. The spring 560 is connected to the fastener 530 to provide resilience for the fastener 530, and then the fastener 530 can restore to the location in FIG. 5 after it rotates.

The cover flip mechanism and the electronic using the same disclosed in the embodiment of the invention utilize the sliding mechanism and the rotating mechanism which cooperate with each other to allow the first casing to slide and rotate relatively to the second casing. In this way, a user can watch the display screen and use the keyboard at the same time.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A cover flip mechanism disposed at an electronic device comprising a first casing and a second casing, the cover flip mechanism comprising:
   a sliding mechanism connected to the first casing and the second casing, wherein the sliding mechanism is used for driving the first casing to slide relatively to the second casing to a rotating location;
   a rotating mechanism having a supporting portion and a rotating portion, wherein the rotating portion is disposed at the second casing and is connected to the supporting portion;
   a fastener pivotally connected to the second casing, wherein the fastener is used to fasten the supporting portion; and
   a protrudent block disposed at the first casing, wherein when the first casing slides relatively to the second casing to the rotating location, the protrudent block pushes the fastener to allow the fastener to rotate, the fastener rotates to move the supporting portion away from the fastener to separate the supporting portion and the fastener without contacting each other, and then the supporting portion can rotate relatively to the second casing via the rotating portion to push the first casing to rotate relatively to the second casing.

2. The cover flip mechanism according to claim 1 further comprising an elastic member abutting against the supporting portion and the elastic member has elastic potential energy.

3. The cover flip mechanism according to claim 2 further comprising a positioning structure disposed at the second casing, wherein the elastic member is coupled to the positioning structure, and the rotating portion is pivotally connected to the positioning structure.

4. The cover flip mechanism according to claim 3, wherein the positioning structure has a protrudent arm for positioning the first casing.

5. The cover flip mechanism according to claim 2, wherein the elastic member is a torsional spring.

6. The cover flip mechanism according to claim 1, wherein the fastener has a first end and a second end, and the protrudent block pushes the first end to allow the second end to rotate relatively to the second casing and release the supporting portion of the rotating mechanism.

7. The cover flip mechanism according to claim 1 further comprising a spring connected to the fastener, wherein the spring is used to provide resilience for the fastener.

8. An electronic device comprising:
a first casing;
a second casing; and
a cover flip mechanism comprising:
a sliding mechanism connected to the first casing and the second casing, wherein the sliding mechanism is used for driving the first casing to slide relatively to the second casing to a rotating location;
a rotating mechanism having a supporting portion and a rotating portion, wherein the rotating portion is disposed at the second casing and is connected to the supporting portion;
a fastener pivotally connected to the second casing, wherein the fastener is used to fasten the supporting portion; and
a protrudent block disposed at the first casing, wherein when the first casing slides relatively to the second casing to the rotating location, the protrudent block pushes the fastener to allow the fastener to rotate, the fastener rotates to move the supporting portion away from the fastener to separate the supporting portion and the fastener without contacting each other, and then the supporting portion can rotate relatively to the second casing via the rotating portion to push the first casing to rotate relatively to the second casing.

9. The electronic device according to claim 8, wherein the cover flip mechanism further comprises an elastic member abutting against the supporting portion and the elastic member has elastic potential energy.

10. The electronic device according to claim 9, wherein the cover flip mechanism further comprises a positioning structure disposed at the second casing, wherein the elastic member is coupled to the positioning structure, and the rotating portion is pivotally connected to the positioning structure.

11. The electronic device according to claim 10, wherein the positioning structure has a protrudent arm for positioning the first casing.

12. The electronic device according to claim 9, wherein the elastic member is a torsional spring.

13. The electronic device according to claim 8, wherein the fastener has a first end and a second end, and the protrudent block pushes the first end to allow the second end to rotate relatively to the second casing and release the supporting portion of the rotating mechanism.

14. The electronic device according to claim 8, wherein the cover flip mechanism further comprises a spring connected to the fastener, wherein the spring is used to provide resilience for the fastener.

15. The electronic device according to claim 8, wherein the first casing comprises a fastening slot, the second casing comprises a hook, and the fastening slot and the hook cooperate with each other to fasten the first casing and the second casing.

16. The electronic device according to claim 8, wherein the second casing has a recess, the first casing has a smooth rounding angle, and the smooth rounding angle is held in the recess to allow the first casing to smoothly rotate relatively to the second casing.

17. The electronic device according to claim 16, wherein the shape of the recess is corresponding to the shape of the smooth rounding angle.

* * * * *